(12) United States Patent
Kojima

(10) Patent No.: US 12,434,680 B2
(45) Date of Patent: Oct. 7, 2025

(54) HYDRAULIC PRESSURE CONTROLLER

(71) Applicant: Robert Bosch GmbH, Stuttgart (DE)

(72) Inventor: Kenta Kojima, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 18/185,169

(22) Filed: Mar. 16, 2023

(65) Prior Publication Data

US 2023/0294652 A1   Sep. 21, 2023

(30) Foreign Application Priority Data

Mar. 18, 2022   (JP) ................ 2022-044360

(51) Int. Cl.
| | |
|---|---|
| *B60T 8/34* | (2006.01) |
| *B60G 17/08* | (2006.01) |
| *B60T 8/36* | (2006.01) |
| *B60T 13/68* | (2006.01) |
| *B60T 17/22* | (2006.01) |
| *B62K 25/04* | (2006.01) |
| *B62L 3/00* | (2006.01) |

(Continued)

(52) U.S. Cl.
CPC ............ *B60T 13/686* (2013.01); *B60G 17/08* (2013.01); *B60T 8/368* (2013.01); *B60T 17/22* (2013.01); *B62K 25/04* (2013.01); *B62L 3/00* (2013.01); *F15B 13/02* (2013.01); *F15B 15/20* (2013.01); *B60G 2300/12* (2013.01); *B60G 2500/11* (2013.01); *B60G 2800/162* (2013.01); *B60T 2260/06* (2013.01); *B60T 2270/406* (2013.01); *B62K 2025/044* (2013.01)

(58) Field of Classification Search
CPC .. B60T 8/368; B60T 8/3225; B60T 2270/406; B60T 2270/415; B60T 13/686; B60G 17/0195; B60G 17/15; B60G 17/16; B60G 2230/12
See application file for complete search history.

(56) References Cited

U.S. PATENT DOCUMENTS

| | | | | |
|---|---|---|---|---|
| 5,678,900 | A | * 10/1997 | Blanz | ................. B60G 17/0523 137/115.19 |
| 5,696,677 | A | * 12/1997 | Leaphart | ................. B60T 8/172 701/37 |

(Continued)

FOREIGN PATENT DOCUMENTS

JP    2018008674 A    1/2018

*Primary Examiner* — Bradley T King
(74) *Attorney, Agent, or Firm* — Michael Best & Friedrich LLP

(57) ABSTRACT

A hydraulic pressure controller includes: a hydraulic pressure control mechanism including a brake control valve for controlling a hydraulic pressure of a brake fluid; and a control substrate including a brake control circuit that controls an operation of the brake control valve. The control substrate includes a suspension control circuit that controls an operation of a suspension control valve for controlling a damping force of a suspension of the vehicle, a first relay that enables energization between the brake control valve and a power supply, and that shuts off energization between the brake control valve and the power supply, and a second relay that enables energization between the suspension control valve and the power supply, and that shuts off energization between the suspension control valve and the power supply.

7 Claims, 6 Drawing Sheets

(51) Int. Cl.
  *F15B 13/02* (2006.01)
  *F15B 15/20* (2006.01)

(56) References Cited

U.S. PATENT DOCUMENTS

| | | | | |
|---|---|---|---|---|
| 5,921,639 | A * | 7/1999 | Hosoya | B60T 8/3675 |
| | | | | 303/119.2 |
| 6,215,672 | B1 * | 4/2001 | Warner | B60T 8/368 |
| | | | | 73/514.01 |
| 7,487,973 | B1 * | 2/2009 | Kesselgruber | B60G 21/073 |
| | | | | 280/5.506 |
| 11,070,252 | B2 * | 7/2021 | Numata | B62J 50/22 |
| 11,813,912 | B1 * | 11/2023 | Ford | B60G 17/0162 |
| 2004/0069545 | A1 * | 4/2004 | Chernoff | B62D 63/025 |
| | | | | 180/65.1 |
| 2009/0236157 | A1 * | 9/2009 | Akamatsu | B60K 17/046 |
| | | | | 180/55 |
| 2009/0243376 | A1 * | 10/2009 | Tahara | B60T 8/3225 |
| | | | | 303/3 |
| 2010/0327542 | A1 * | 12/2010 | Hara | B62K 25/286 |
| | | | | 280/5.503 |
| 2019/0270358 | A1 * | 9/2019 | Korrect | B60G 17/018 |
| 2022/0411010 | A1 * | 12/2022 | Chiba | B60T 13/686 |
| 2023/0147844 | A1 * | 5/2023 | Heon | B60G 11/27 |
| | | | | 280/5.5 |
| 2023/0286451 | A1 * | 9/2023 | Bauer | B60R 16/0231 |
| 2024/0001924 | A1 * | 1/2024 | Giovanardi | B60W 30/04 |
| 2024/0092135 | A1 * | 3/2024 | Randall | B60G 17/08 |
| 2024/0239277 | A1 * | 7/2024 | Henseleit | H04L 12/4625 |

* cited by examiner

HYDRAULIC PRESSURE CONTROLLER

BACKGROUND OF THE INVENTION

The present disclosure relates to a hydraulic pressure controller capable of properly saving a mounting space for devices in a vehicle.

A vehicle is provided with a hydraulic pressure controller for controlling a braking force generated in a wheel (for example, refer to JP2018-8674A). In the hydraulic pressure controller, a hydraulic pressure of a brake fluid is controlled by a hydraulic pressure control mechanism including valves. The operation of the valves of the hydraulic pressure control mechanism is controlled by a control substrate of the hydraulic pressure controller.

SUMMARY OF THE INVENTION

Control units other than the hydraulic pressure controller are also mounted to the vehicle. Each control unit is provided with a control substrate, and various controls are performed by each control substrate. In such a manner, the separate mounting of various control units to the vehicle is one of factors that oppresses a mounting space (namely, a space in which devices can be mounted) in the vehicle.

The invention is conceived in view of the above-described problem, and an object of the invention is to obtain a hydraulic pressure controller capable of properly saving a mounting space for devices in a vehicle.

According to an aspect of the invention, there is provided a hydraulic pressure controller for a vehicle, the controller including: a hydraulic pressure control mechanism including a brake control valve for controlling a hydraulic pressure of a brake fluid; and a control substrate including a brake control circuit that controls an operation of the brake control valve. The control substrate includes a suspension control circuit that controls an operation of a suspension control valve for controlling a damping force of a suspension of the vehicle, a first relay that enables energization between the brake control valve and a power supply when the first relay is in a closed state, and that shuts off energization between the brake control valve and the power supply when the first relay is in an open state, and a second relay that is separate from the first relay, that enables energization between the suspension control valve and the power supply when the second relay is in a closed state, and that shuts off energization between the suspension control valve and the power supply when the second relay is in an open state.

According to an aspect of the invention, there is provided a hydraulic pressure controller for a vehicle, the controller including: a hydraulic pressure control mechanism including a brake control valve for controlling a hydraulic pressure of a brake fluid; and a control substrate including a brake control circuit that controls an operation of the brake control valve. The control substrate includes a suspension control circuit that controls an operation of a suspension control valve for controlling a damping force of a suspension of the vehicle, a first relay that enables energization between the brake control valve and a power supply when the first relay is in a closed state, and that shuts off energization between the brake control valve and the power supply when the first relay is in an open state, and a second relay that is separate from the first relay, that enables energization between the suspension control valve and the power supply when the second relay is in a closed state, and that shuts off energization between the suspension control valve and the power supply when the second relay is in an open state. Therefore, since a function of controlling the hydraulic pressure of the brake fluid and a function of controlling the damping force of the suspension are integrated into the hydraulic pressure controller that is one control unit, the number of controllers mounted to the vehicle can be reduced. Specifically, a suspension control unit including a substrate and a housing that houses the substrate is not provided to the vehicle separately from the hydraulic pressure controller, so that a mounting space for devices in the vehicle can be saved. Further, since electric power can be supplied to both the brake control valve and the suspension control valve, and electric power can be independently supplied to only one thereof, it is possible to suppress occurrence of a situation in which both the function of controlling the hydraulic pressure of the brake fluid and the function of controlling the damping force of the suspension cannot be used. Therefore, even in the case where the function of controlling the hydraulic pressure of the brake fluid and the function of controlling the damping force of the suspension are integrated into the hydraulic pressure controller, it is possible to suppress unnecessary occurrence of a situation in which both the functions cannot be used. Consequently, a mounting space for devices in the vehicle can be properly saved.

DETAILED DESCRIPTION

Figure 1:
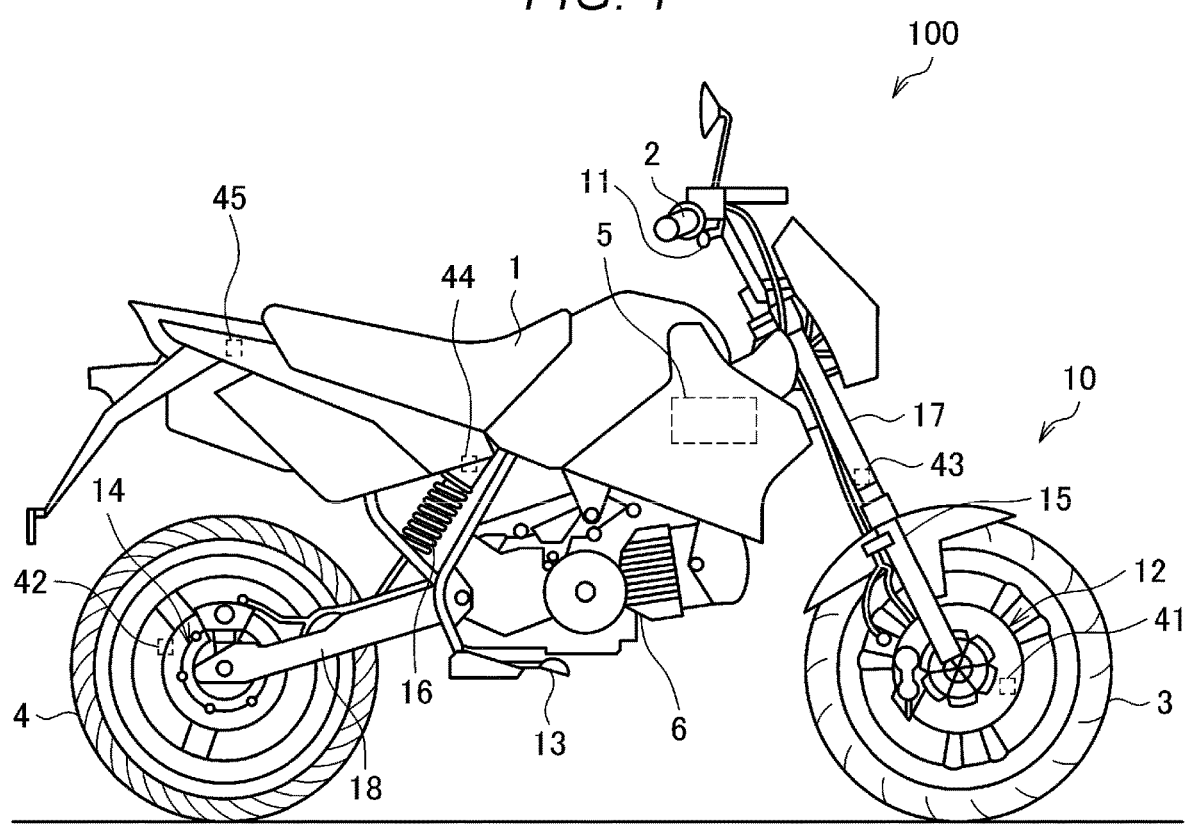
FIG. 1 is a schematic diagram showing a schematic configuration of a vehicle according to an embodiment of the invention.

Hereinafter, a hydraulic pressure controller according to the invention will be described with reference to the drawings.

Incidentally, hereinafter, a hydraulic pressure controller used for a two-wheeled motorcycle (refer to a vehicle 100 in FIG. 1) will be described, but the hydraulic pressure controller according to the invention may be used for vehicles other than the two-wheeled motorcycle. For example, the hydraulic pressure controller according to the invention may be used for straddle-type vehicles other than the two-wheeled motorcycle. The straddle-type vehicle means a vehicle that a rider straddles. The straddle-type vehicle includes, for example, motorcycles (a motored two-wheeled vehicle and a motored three-wheeled vehicle), a bicycle, a buggy, and the like. The motorcycle includes a vehicle using an engine as a power source, a vehicle using an electric motor as a power source, and the like. The motorcycle includes, for example, an autobicycle, a scooter, an electric scooter, and the like. The bicycle means a vehicle that can be propelled on a road by a rider's pedal effort applied to pedals. The bicycle includes a normal bicycle, an electrically assisted bicycle, an electric bicycle, and the like. In addition, for example, the hydraulic pressure controller according to the invention may be used for vehicles (for example, a four-wheeled vehicle) other than the straddle-type vehicle.

In addition, hereinafter, an example will be described in which the hydraulic pressure controller controls both a braking force generated in a front wheel and a braking force generated in a rear wheel. However, the hydraulic pressure controller according to the invention may control only one of the braking force generated in the front wheel and the braking force generated in the rear wheel.

In addition, configurations, operation, and the like to be described below are one example, and the hydraulic pressure controller according to the invention is not limited to such configurations, operation, and the like.

In addition, hereinafter, the same or similar descriptions will be simplified or omitted as appropriate. In addition, in the drawings, the same or similar members or portions will not be denoted by reference signs or will be denoted by the same reference signs. In addition, illustrations of detailed structures will be simplified or omitted as appropriate.

<Configuration of Vehicle>

A schematic configuration of the vehicle 100 according to an embodiment of the invention will be described with reference to FIGS. 1 to 5.

FIG. 1 is a schematic diagram showing a schematic configuration of the vehicle 100. The vehicle 100 is a two-wheeled motorcycle corresponding to one example of a vehicle according to the invention. As shown in FIG. 1, the vehicle 100 includes a body 1, a handlebar 2, a front wheel 3, a rear wheel 4, a hydraulic pressure controller 5, and an engine 6. In addition, the vehicle 100 includes a brake system 10. The brake system 10 includes a first brake operation unit 11, a front wheel brake mechanism 12, a second brake operation unit 13, and a rear wheel brake mechanism 14. In addition, the vehicle 100 includes a front suspension 15, a rear suspension 16, a front fork 17, and a swing arm 18.

The hydraulic pressure controller 5 is intended to control a braking force generated in a wheel of the vehicle 100. The hydraulic pressure controller 5 is included in the brake system 10. Details of the hydraulic pressure controller 5 will be described later.

The engine 6 corresponds to one example of a power source of the vehicle 100, and can output power for driving the rear wheel 4 that is a drive wheel. For example, the engine 6 is provided with one or a plurality of cylinders in which combustion chambers are formed; fuel injectors that inject fuel toward the combustion chambers; and spark plugs. An air-fuel mixture containing air and the fuel is formed in the combustion chamber by the injection of the fuel from the fuel injector, and the air-fuel mixture is ignited by the spark plug and is combusted. Therefore, a piston provided in the cylinder reciprocates and a crankshaft rotates. In addition, a throttle valve is provided to an intake pipe of the engine 6, and the amount of intake air to the combustion chamber is changed according to a throttle opening degree that is an opening degree of the throttle valve. Incidentally, instead of the engine 6, an electric motor may be used as the power source of the vehicle 100.

The front suspension 15 and the rear suspension 16 correspond to one example of a suspension of the vehicle 100, and are interposed between the body 1 and the wheels. Specifically, the front suspension 15 is provided to the front fork 17 that connects the handlebar 2 and the front wheel 3, and is extendable and contractable along an axial direction of the front suspension 15. In addition, the rear suspension 16 connects the body 1 and the swing arm 18 that is swingably supported by the body 1 and that rotatably holds the rear wheel 4, and is extendable and contractable in an axial direction of the rear suspension 16. A suspension control valve (refer to a suspension control valve V2 of FIG. 4 to be described later) for controlling a damping force of each suspension is provided to a flow path of a hydraulic oil of each suspension.

Specifically, the brake system 10 includes the hydraulic pressure controller 5 in addition to the first brake operation unit 11, the front wheel brake mechanism 12, the second brake operation unit 13, and the rear wheel brake mechanism 14. The first brake operation unit 11 is provided to the handlebar 2, and is operated by rider's hands. The first brake operation unit 11 is, for example, a brake lever. The front wheel brake mechanism 12 brakes the front wheel 3 in conjunction with at least the first brake operation unit 11. The second brake operation unit 13 is provided to a lower portion of the body 1, and is operated by a rider's foot. The second brake operation unit 13 is, for example, a brake pedal. The rear wheel brake mechanism 14 brakes the rear wheel 4 in conjunction with at least the second brake operation unit 13. The hydraulic pressure controller 5 is a unit that functions to control a braking force applied to the front wheel 3 by the front wheel brake mechanism 12, and a braking force applied to the rear wheel 4 by the rear wheel brake mechanism 14.

Figure 2:
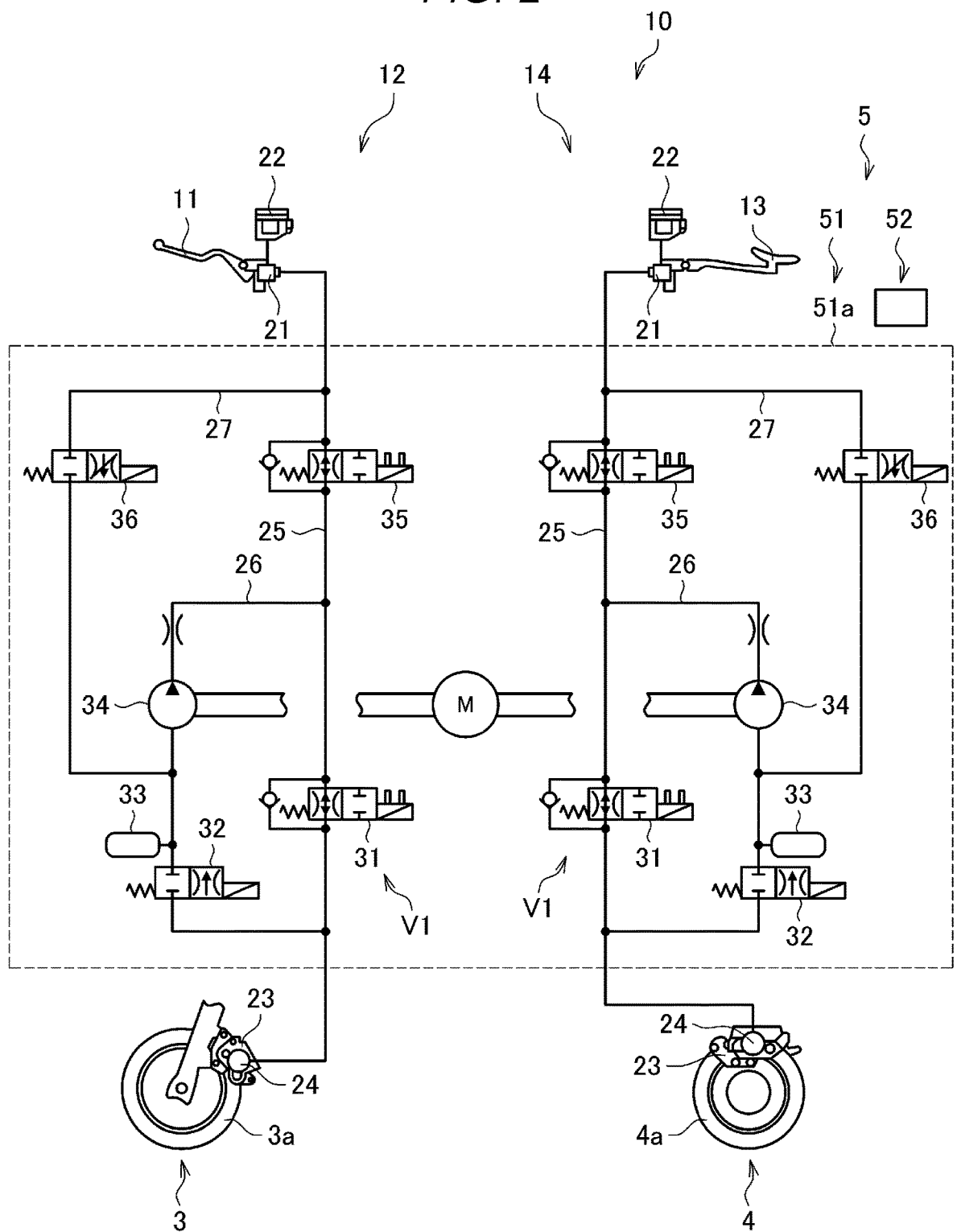
FIG. 2 is a schematic diagram showing a schematic configuration of a brake system according to the embodiment of the invention.

FIG. 2 is a schematic diagram showing a schematic configuration of the brake system 10. As shown in FIG. 2, each of the front wheel brake mechanism 12 and the rear wheel brake mechanism 14 includes a master cylinder 21 in which a piston (not shown) is built-in; a reservoir 22 attached to the master cylinder 21; a brake caliper 23 that is held by the body 1 and that includes brake pads (not shown); a wheel cylinder 24 provided to the brake caliper 23; a main flow path 25 that allows a brake fluid of the master cylinder 21 to flow to the wheel cylinder 24; a sub-flow path 26 that releases the brake fluid of the wheel cylinder 24; and a supply flow path 27 that supplies the brake fluid of the master cylinder 21 to the sub-flow path 26.

An inlet valve (EV) 31 is provided to the main flow path 25. The sub-flow path 26 bypasses the main flow path 25 between a wheel cylinder 24 side and a master cylinder 21 side with respect to the inlet valve 31. An outlet valve (AV) 32, an accumulator 33, and a pump 34 are provided to the sub-flow path 26 in order from an upstream side. A first valve (USV) 35 is provided between a master cylinder 21-side end portion of the main flow path 25 and a location where a downstream-side end portion of the sub-flow path 26 is connected to the main flow path 25. The supply flow path 27 allows communication between the master cylinder 21 and a suction side of the pump 34 in the sub-flow path 26. A second valve (HSV) 36 is provided to the supply flow path 27.

The inlet valve 31 is, for example, an electromagnetic valve that is opened in a de-energized state and that is closed in an energized state. The outlet valve 32 is, for example, an electromagnetic valve that is closed in a de-energized state and that is opened in an energized state. The first valve 35 is, for example, an electromagnetic valve that is opened in a de-energized state and that is closed in an energized state. The second valve 36 is, for example, an electromagnetic valve that is closed in a de-energized state and is opened in an energized state.

The hydraulic pressure controller 5 includes a hydraulic pressure control mechanism 51 for controlling hydraulic pressure of the brake fluid, and a control substrate 52 that controls the operation of the hydraulic pressure control mechanism 51. The hydraulic pressure control mechanism 51 includes components such as the inlet valve 31, the outlet valve 32, the accumulator 33, the pump 34, the first valve 35, and the second valve 36 described above. Particularly, the inlet valve 31, the outlet valve 32, the first valve 35, and the second valve 36 correspond to one example of a brake control valve V1 for controlling the hydraulic pressure of the brake fluid. The hydraulic pressure control mechanism 51 includes a base body 51a in which flow paths such as the main flow path 25, the sub-flow path 26, and the supply flow path 27 described above are formed, and the above-described components are provided to the base body 51a.

Incidentally, the base body 51a may be formed of one member or may be formed of a plurality of members. In addition, when the base body 51a is formed of a plurality of members, each component may be separately provided in different members.

The operation of the hydraulic pressure control mechanism 51 is controlled by the control substrate 52, thereby controlling a braking force generated in the front wheel 3 by the front wheel brake mechanism 12, and a braking force generated in the rear wheel 4 by the rear wheel brake mechanism 14. The control substrate 52 controls the operation of the hydraulic pressure control mechanism 51 according to, for example, a traveling state of the vehicle 100.

For example, in a normal state (namely, a state where anti-lock brake control or the like to be described later is not executed), the control substrate 52 causes the inlet valve 31 to open, causes the outlet valve 32 to close, causes the first valve 35 to open, and causes the second valve 36 to close. In this state, when the first brake operation unit 11 is operated, in the front wheel brake mechanism 12, the piston (not shown) of the master cylinder 21 is pushed in to increase the hydraulic pressure of the brake fluid of the wheel cylinder 24, and the brake pads (not shown) of the brake caliper 23 are pressed against a rotor 3a of the front wheel 3 to apply a braking force to the front wheel 3. In addition, when the second brake operation unit 13 is operated, in the rear wheel brake mechanism 14, the piston (not shown) of the master cylinder 21 is pushed in to increase the hydraulic pressure of the brake fluid of the wheel cylinder 24, and the brake pads (not shown) of the brake caliper 23 are pressed against a rotor 4a of the rear wheel 4 to apply a braking force to the rear wheel 4.

The anti-lock brake control is, for example, an operation that is executed when a wheel (specifically, the front wheel 3 or the rear wheel 4) is locked or is likely to be locked, to reduce a braking force applied to the wheel, regardless of the operation of a brake operation unit by the rider. For example, in a state where the anti-lock brake control is executed, the control substrate 52 causes the inlet valve 31 to close, causes the outlet valve 32 to open, causes the first valve 35 to open, and causes the second valve 36 to close. In this state, the pump 34 is driven by the control substrate 52, thereby reducing the hydraulic pressure of the brake fluid of the wheel cylinder 24, and reducing a braking force applied to the wheel.

The control substrate 52 executes various controls using various information detected in the vehicle 100. For example, as shown in FIG. 1, the vehicle 100 includes a front wheel speed sensor 41, a rear wheel speed sensor 42, a front stroke sensor 43, a rear stroke sensor 44, and an inertia measurement device 45. Detection results of these sensors are output to the control substrate 52.

The front wheel speed sensor 41 is a wheel speed sensor that detects a wheel speed of the front wheel 3 (for example, a rotational frequency per unit time [rpm], a movement distance per unit time [km/h], or the like of the front wheel 3), and outputs a detection result. The front wheel speed sensor 41 may detect another physical quantity that can be substantially converted into a wheel speed of the front wheel 3. The front wheel speed sensor 41 is provided to the front wheel 3.

The rear wheel speed sensor 42 is a wheel speed sensor that detects a wheel speed of the rear wheel 4 (for example, a rotational frequency per unit time [rpm], a movement distance per unit time [km/h], or the like of the rear wheel 4), and outputs a detection result. The rear wheel speed sensor 42 may detect another physical quantity that can be substantially converted into a wheel speed of the rear wheel 4. The rear wheel speed sensor 42 is provided to the rear wheel 4.

The front stroke sensor 43 detects a stroke amount of the front suspension 15, and outputs a detection result. The front stroke sensor 43 may detect another physical quantity that can be substantially converted into a stroke amount of the front suspension 15. The front stroke sensor 43 is provided to the front suspension 15.

The rear stroke sensor 44 detects a stroke amount of the rear suspension 16, and outputs a detection result. The rear stroke sensor 44 may detect another physical quantity that can be substantially converted into a stroke amount of the rear suspension 16. The rear stroke sensor 44 is provided to the rear suspension 16.

The inertia measurement device 45 includes a three-axis gyro sensor and a three-direction acceleration sensor, and detects a posture of the vehicle 100. The inertia measurement device 45 is provided to, for example, the body of the vehicle 100. For example, the inertia measurement device 45 detects a lean angle and a pitch angle of the vehicle 100, and outputs a detection result. The inertia measurement device 45 may detect other physical quantities that can be substantially converted into a lean angle and a pitch angle of the vehicle 100. The inertia measurement device 45 may include only a part of the three-axis gyro sensor and the three-direction acceleration sensor.

Figure 3:
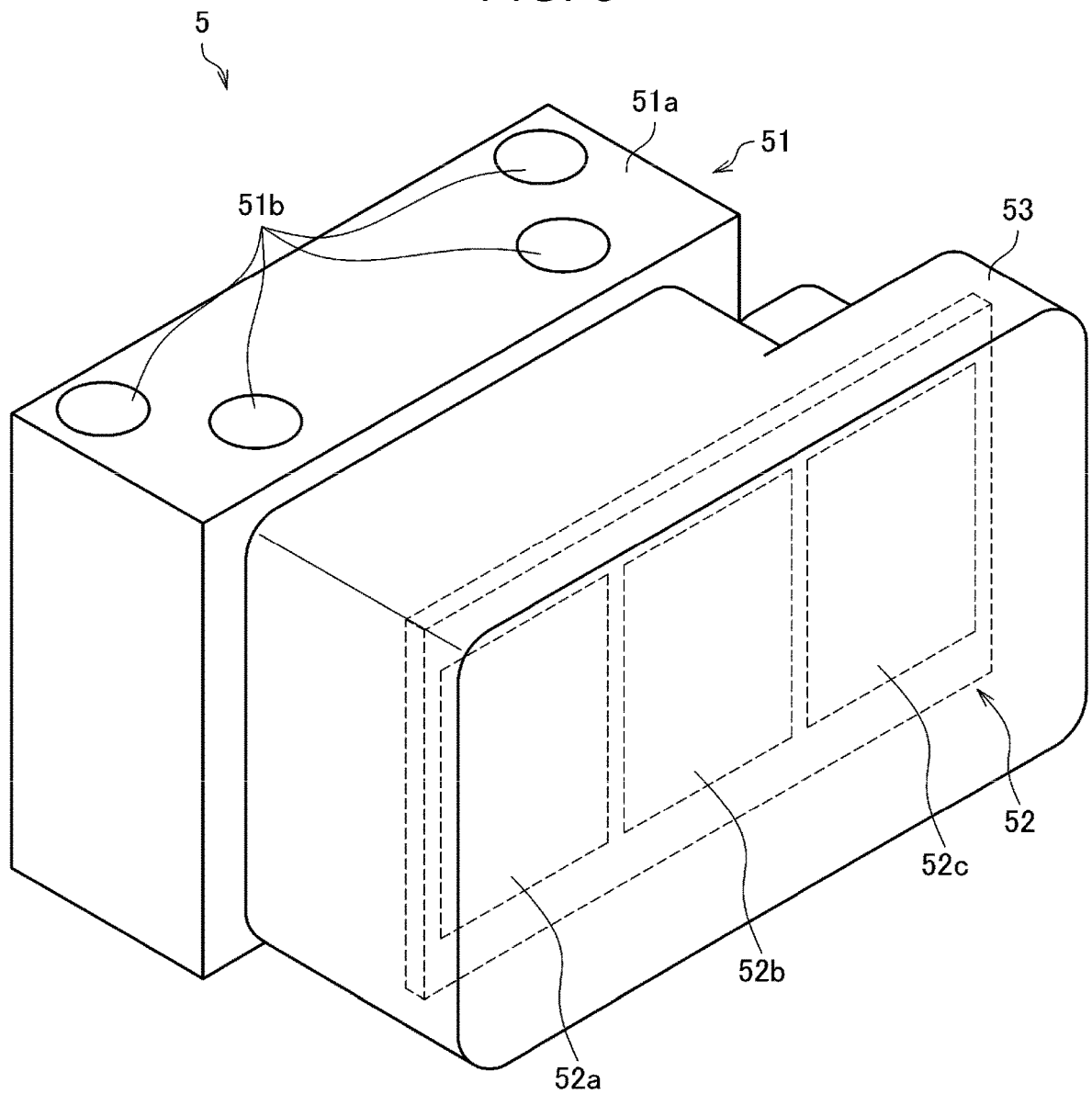
FIG. 3 is a perspective diagram showing an external appearance of a hydraulic pressure controller according to the embodiment of the invention.

FIG. 3 is a perspective diagram showing an external appearance of the hydraulic pressure controller 5. As shown in FIG. 3, the hydraulic pressure controller 5 includes the hydraulic pressure control mechanism 51 including the base body 51a, the control substrate 52, and a casing 53 that houses the control substrate 52.

The base body 51a is made of, for example, a metal material, and has a substantially rectangular parallelepiped shape. A plurality of ports 51b communicating with each of the flow paths is formed on an outer surface of the base body 51a, and a brake fluid pipe connected to the master cylinder 21 or to the wheel cylinder 24 is attached to each of the ports 51b.

The control substrate 52 includes a brake control circuit 52a, a suspension control circuit 52b, and an integrated control circuit 52c. The brake control circuit 52a controls the operation of the brake control valve V1. Therefore, the hydraulic pressure of the brake fluid acting on a wheel of the vehicle 100 can be controlled. The suspension control circuit 52b controls the operation of the suspension control valve (refer to the suspension control valve V2 of FIG. 4 to be described later). Therefore, the damping forces of the front suspension 15 and the rear suspension 16 can be controlled. Incidentally, damping force control may be performed on both the front suspension 15 and the rear suspension 16, and damping force control may be performed on only one of the front suspension 15 and the rear suspension 16. The integrated control circuit 52c controls the operation of the brake control circuit 52a and the suspension control circuit 52b in an integrated manner. Incidentally, the integrated control circuit 52c may be omitted from the control substrate 52.

The casing 53 is made of, for example, a resin material, and has a substantially hollow rectangular parallelepiped shape in which an opening is formed. The casing 53 is attached to the base body 51a by bolts or the like such that the opening of the casing 53 is closed by the base body 51a. For example, the casing 53 may be directly held by the base body 51a or may be indirectly held via another member. The control substrate 52 is housed in such the casing 53. Specifically, the control substrate 52 is housed in a space defined by the base body 51a and the casing 53.

As described above, the control substrate 52 of the hydraulic pressure controller 5 includes the brake control circuit 52a that controls the operation of the brake control valve V1, and the suspension control circuit 52b that controls the operation of the suspension control valve V2. Therefore, since a function of controlling the hydraulic pressure of the brake fluid and a function of controlling a damping force of a suspension are integrated into the hydraulic pressure controller 5 that is one control unit, the number of control units mounted to the vehicle 100 can be reduced. Specifically, a suspension control unit including a substrate and a housing that houses the substrate is not provided to the vehicle 100 separately from the hydraulic pressure controller 5, so that a mounting space for devices in the vehicle 100 can be saved.

Figure 4:
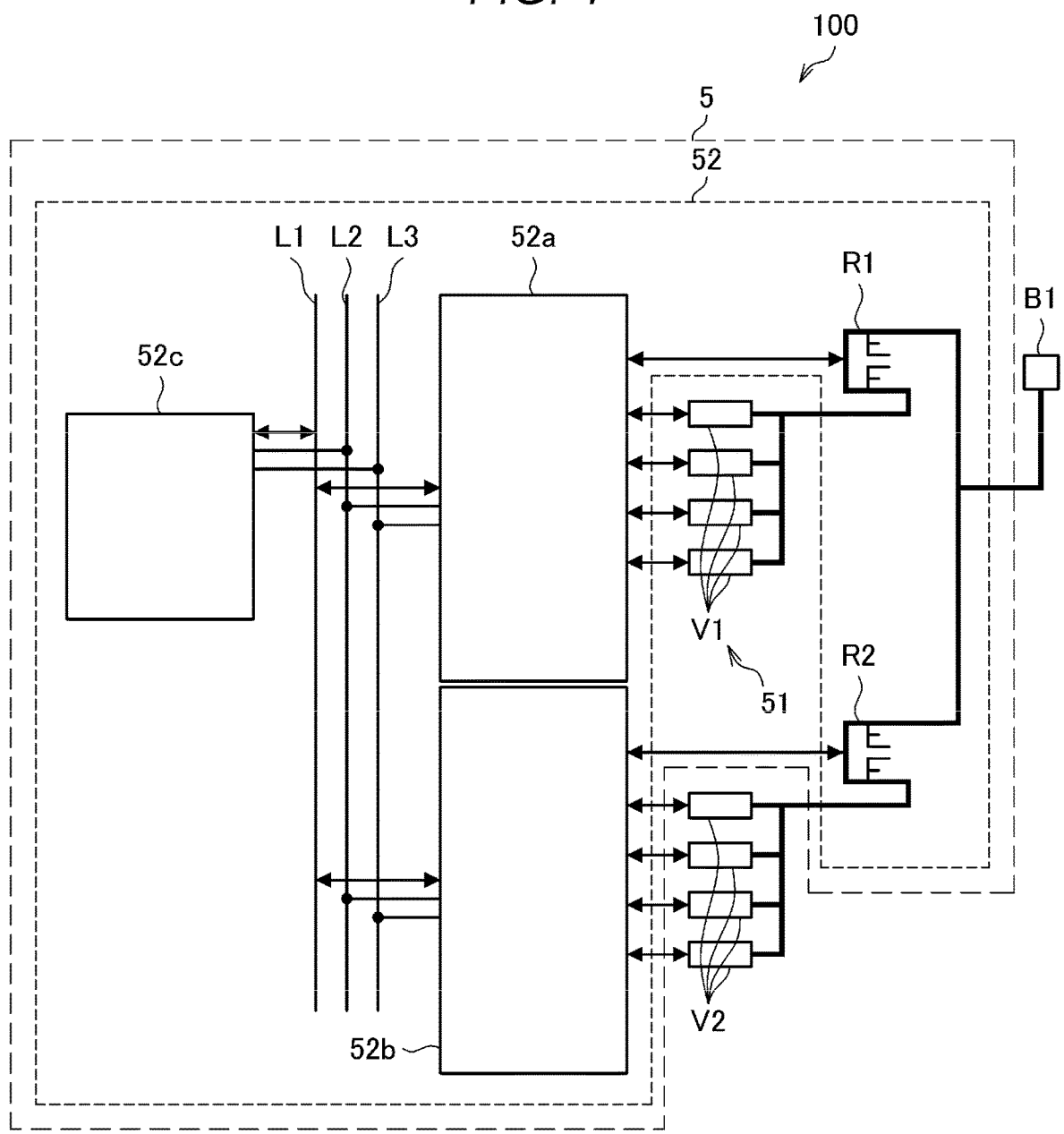
FIG. 4 is a schematic diagram showing an electrical connection relationship between components including a control substrate of the hydraulic pressure controller according to the embodiment of the invention.

FIG. 4 is a schematic diagram showing an electrical connection relationship between components including the control substrate 52 of the hydraulic pressure controller 5. As shown in FIG. 4, the vehicle 100 is provided with the hydraulic pressure controller 5 including the brake control valve V1; the suspension control valve V2; and a power supply B1, and these components are electrically connected to each other. Incidentally, FIG. 4 shows an example in which the number of the brake control valves V1 and of the suspension control valves V2 is four, but the number of the valves is not particularly limited and may be a number other than four.

In the control substrate 52 of the hydraulic pressure controller 5, the brake control circuit 52a, the suspension control circuit 52b, and the integrated control circuit 52c are connected to a common communication line L1. Therefore, noise is reduced due to sharing of the communication line L1 between the control circuits, the communication line L1 being provided in the control substrate 52, so that communication is stabilized and the brake control circuit 52a, the suspension control circuit 52b, and the integrated control circuit 52c can communicate with a device outside the hydraulic pressure controller 5 via the communication line L1. In addition, the control circuits can also directly communicate with each other via the communication line L1 (for example, SPI communication line). Incidentally, the communication line L1 may be a communication line conforming to various communication standards, and is not limited to the SPI communication line.

In addition, in the control substrate 52 of the hydraulic pressure controller 5, the brake control circuit 52a, the suspension control circuit 52b, and the integrated control circuit 52c are connected to a common ground line L2. Therefore, noise is reduced by setting a reference potential of each control circuit via the ground line L2 provided in the control substrate 52, so that communication can be stabilized. Therefore, communication between each control circuit and each device is properly realized.

In addition, in the control substrate 52 of the hydraulic pressure controller 5, the brake control circuit 52a, the suspension control circuit 52b, and the integrated control circuit 52c are connected to a common power supply line L3. Therefore, the supply of electric power to each control circuit is realized by the power supply line L3 provided in the control substrate 52, so that electric power can be stably supplied to each control circuit. Incidentally, a power supply connected to the power supply line L3 is a power supply that is separate from the power supply B1 shown in FIG. 4.

The brake control circuit 52a is electrically connected to the brake control valve V1. Therefore, the input and output of a signal can be performed between the brake control circuit 52a and the brake control valve V1. The suspension control circuit 52b is electrically connected to the suspension control valve V2. Therefore, the input and output of a signal can be performed between the suspension control circuit 52b and the suspension control valve V2.

The control substrate 52 is provided with a first relay R1 and a second relay R2 in addition to the brake control circuit 52a, the suspension control circuit 52b, and the integrated control circuit 52c. The first relay R1 and the second relay R2 are separate relays that are different from each other. Each of the first relay R1 and the second relay R2 switches whether to make an energization at an installation position. When a relay is in a closed state, an electric current can pass through the relay. On the other hand, when a relay is in an open state, an electric current cannot pass through the relay. Each relay is, for example, a semiconductor relay including one or two or more field effect transistors (FETs). However, the configuration of each relay is not particularly limited and may not be a semiconductor relay. Here, the brake control valve V1 and the suspension control valve V2 are driven by electric power supplied from the common power supply B1. Each relay switches whether to make an energization between each valve and the power supply B1.

The brake control valve V1 is connected to the power supply B1 via the first relay R1. Therefore, when the first relay R1 is in a closed state, an electric current can flow from the power supply B1 to the brake control valve V1. On the other hand, when the first relay R1 is in an open state, an electric current cannot flow from the power supply B1 to the brake control valve V1. Namely, the first relay R1 enables energization between the brake control valve V1 and the power supply B1 when the first relay R1 is in a closed state, and shuts off energization between the brake control valve V1 and the power supply B1 when the first relay R1 is in an open state.

When the first relay R1 is in a closed state, the brake control circuit 52a can drive the brake control valve V1 using electric power supplied from the power supply B1. Therefore, the function of controlling the hydraulic pressure of the brake fluid can be used. On the other hand, when the first relay R1 is in an open state, electric power is not supplied from the power supply B1 to the brake control valve V1, so that the brake control circuit 52a cannot drive the brake control valve V1. Therefore, the function of controlling the hydraulic pressure of the brake fluid cannot be used.

The first relay R1 is electrically connected to the brake control circuit 52a, and the input and output of a signal can be performed between the brake control circuit 52a and the first relay R1. Therefore, the brake control circuit 52a can control an opening and closing operation of the first relay R1.

The suspension control valve V2 is connected to the power supply B1 via the second relay R2. Therefore, when the second relay R2 is in a closed state, an electric current can flow from the power supply B1 to the suspension control valve V2. On the other hand, when the second relay R2 is in an open state, an electric current cannot flow from the power supply B1 to the suspension control valve V2. Namely, the second relay R2 enables energization between the suspension control valve V2 and the power supply B1 when the second relay R2 is in a closed state, and shuts off energization between the suspension control valve V2 and the power supply B1 when the second relay R2 is in an open state.

When the second relay R2 is in a closed state, the suspension control circuit 52b can drive the suspension control valve V2 using electric power supplied from the power supply B1. Therefore, the function of controlling a damping force of a suspension can be used. On the other hand, when the second relay R2 is in an open state, electric power is not supplied from the power supply B1 to the suspension control valve V2, so that the suspension control circuit 52b cannot drive the suspension control valve V2. Therefore, the function of controlling a damping force of a suspension cannot be used.

The second relay R2 is electrically connected to the suspension control circuit 52b, and the input and output of a signal can be performed between the suspension control circuit 52b and the second relay R2. Therefore, the suspension control circuit 52b can control an opening and closing operation of the second relay R2.

As described above, the control substrate 52 of the hydraulic pressure controller 5 includes the first relay R1 that enables energization between the brake control valve V1 and the power supply B1 when the first relay R1 is in a closed state, and that shuts off energization between the brake control valve V1 and the power supply B1 when the first relay R1 is in an open state, and the second relay R2 that is separate from the first relay R1, that enables energization between the suspension control valve V2 and the power supply B1 when the second relay R2 is in a closed state, and that shuts off energization between the suspension control valve V2 and the power supply B1 when the second relay R2 is in an open state.

Here, for example, in consideration of cost or the like, an example is considered in which the brake control valve V1 and the suspension control valve V2 are connected to the power supply B1 via one common relay. In this case, it is not possible to supply electric power to only one of the brake control valve V1 and the suspension control valve V2. In this case, for example, when an abnormality has occurred in only one of the brake control valve V1 and the suspension control valve V2, it is necessary to stop the supply of electric power to both the brake control valve V1 and the suspension control valve V2 by setting a relay to an open state. Namely, a situation unnecessarily occurs in which a normal valve that can be originally used cannot be used, and both the function of controlling the hydraulic pressure of the brake fluid and the function of controlling a damping force of a suspension cannot be used.

On the other hand, in the hydraulic pressure controller 5 according to the present embodiment, electric power can be supplied to both the brake control valve V1 and the suspension control valve V2, and electric power can be independently supplied to only one thereof. Therefore, for example, when an abnormality has occurred in only one of the brake control valve V1 and the suspension control valve V2, it is possible to suppress occurrence of a situation in which both the function of controlling the hydraulic pressure of the brake fluid and the function of controlling a damping force of a suspension cannot be used.

Figure 5:
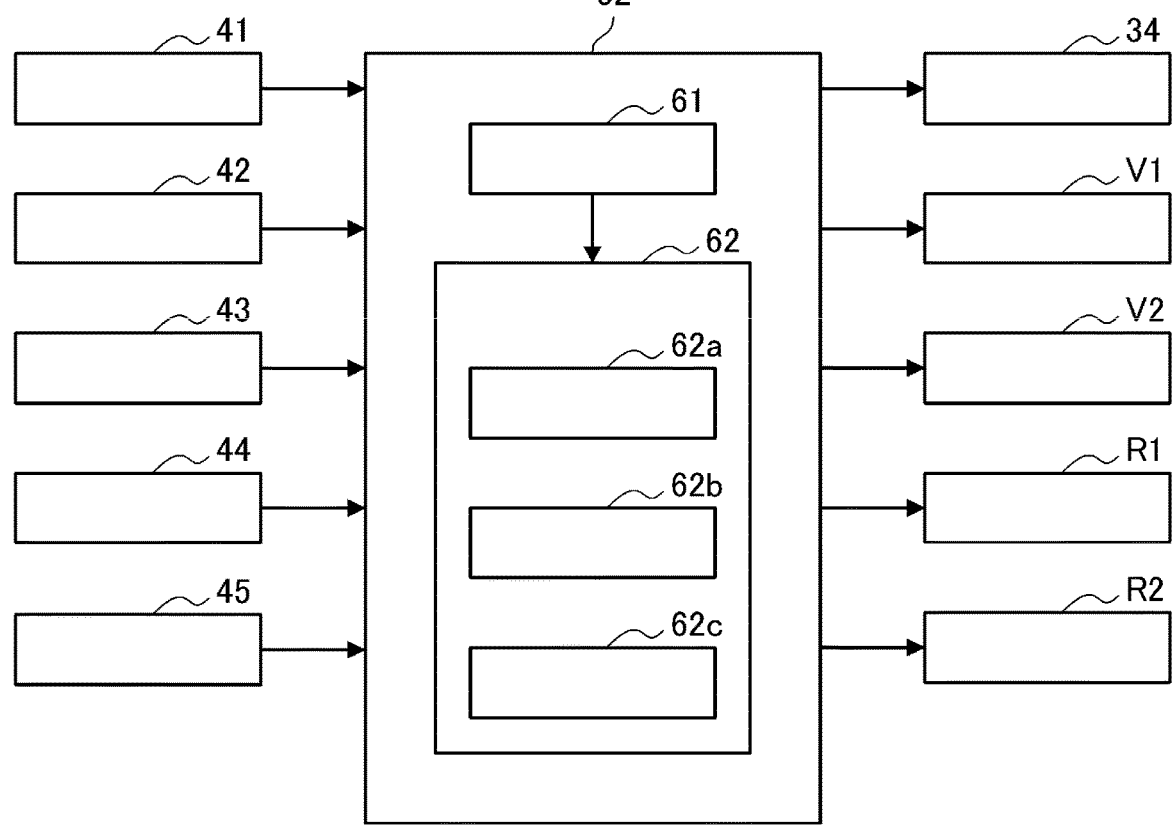
FIG. 5 is a block diagram showing one example of a functional configuration of the control substrate according to the embodiment of the invention.

FIG. 5 is a block diagram showing one example of a functional configuration of the control substrate 52. As shown in FIG. 5, the control substrate 52 includes, for example, an acquisition unit 61 and a controller 62. The functions of the acquisition unit 61 and the controller 62 are realized by a microcomputer, a microprocessor unit, or the like included in the above-described various circuits provided to the control substrate 52.

The acquisition unit 61 acquires information from various sensors in the vehicle 100. For example, the acquisition unit 61 acquires information from the front wheel speed sensor 41, the rear wheel speed sensor 42, the front stroke sensor 43, the rear stroke sensor 44, and the inertia measurement device 45.

The controller 62 controls the operation of various devices in the vehicle 100. For example, the controller 62 includes a brake controller 62a, a suspension controller 62b, and a relay controller 62c. The brake controller 62a controls the operation of the brake control valve V1. The function of the brake controller 62a is realized mainly by the brake control circuit 52a. The suspension controller 62b controls the operation of the suspension control valve V2. The function of the suspension controller 62b is realized mainly by the suspension control circuit 52b. The relay controller 62c controls the operation of the first relay R1 and the second relay R2. The function of the relay controller 62c is realized mainly by the brake control circuit 52a and by the suspension control circuit 52b.

As described above, the control substrate 52 executes various controls using various information detected in the vehicle 100. For example, the brake controller 62a executes anti-lock brake control using a detection result of the front wheel speed sensor 41 and a detection result of the rear wheel speed sensor 42. In addition, for example, the suspension controller 62b executes the control of a damping force of each suspension using a detection result of the front stroke sensor 43, a detection result of the rear stroke sensor 44, and a detection result of the inertia measurement device 45.

Here, it is preferable that the control of the hydraulic pressure of the brake fluid and the control of a damping force of a suspension are executed in cooperation with each other. For example, when the brake controller 62a executes the control of the hydraulic pressure of the brake fluid to stabilize the posture of the vehicle 100, the suspension controller 62b may execute the control of a damping force of a suspension such that the posture of the vehicle 100 is stabilized. In such a case, it is preferable that the suspension controller 62b performs the control of a damping force of a suspension based on an influence of the control of the hydraulic pressure of the brake fluid by the brake controller 62a on the posture of the vehicle 100. On the other hand, it is preferable that the brake controller 62a performs the control of the hydraulic pressure of the brake fluid based on an influence of the control of a damping force of a suspension by the suspension controller 62b on the posture of the vehicle 100. Such cooperative control is realized by, for example, the integrated control circuit 52c.

<Operation of Hydraulic Pressure Controller>

The operation of the hydraulic pressure controller 5 according to the embodiment of the invention will be described with reference to FIGS. 6 to 8.

As described above, in the hydraulic pressure controller 5, since electric power can be supplied to both the brake control valve V1 and the suspension control valve V2, and electric power can be independently supplied to only one thereof, it is possible to suppress occurrence of a situation in which both the function of controlling the hydraulic pressure of the brake fluid and the function of controlling a damping force of a suspension cannot be used. Hereinafter, as examples of control processing related to electric power supply performed by the control substrate 52, a first processing example, a second processing example, and a third processing example will be described in order.

Figure 6:
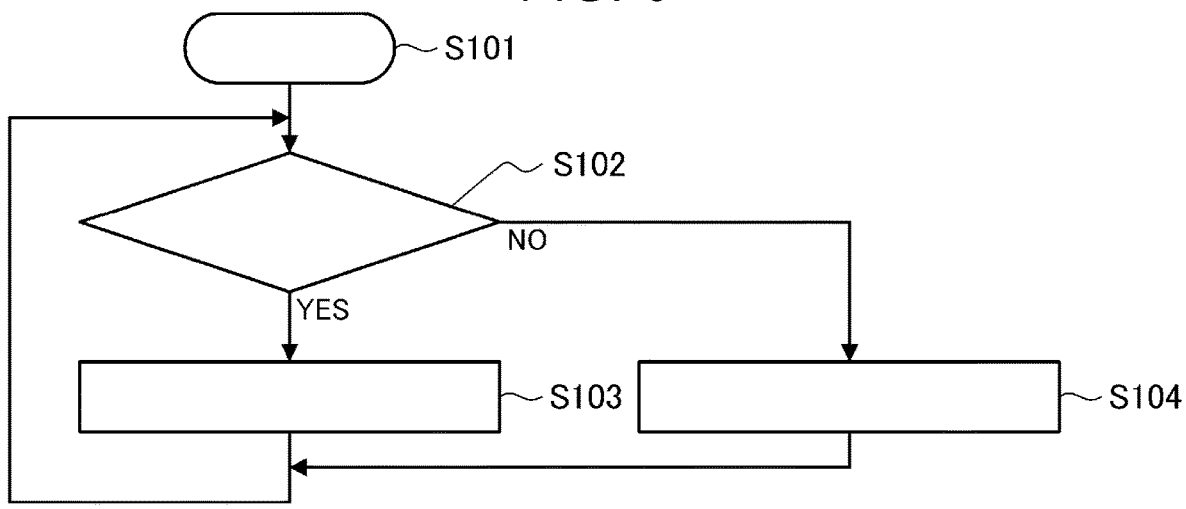
FIG. 6 is a flowchart showing the flow of a first processing example performed by the control substrate according to the embodiment of the invention.

FIG. 6 is a flowchart showing the flow of the first processing example performed by the control substrate 52. Step S101 in FIG. 6 corresponds to a start of a control flow shown in FIG. 6.

When the control flow of the first processing example shown in FIG. 6 is started, in step S102, the control substrate 52 determines whether an abnormality has occurred in the suspension control valve V2.

An abnormality of the suspension control valve V2 means a state where the suspension control valve V2 cannot be properly controlled. Examples of an abnormality of the suspension control valve V2 include a state where a movable portion of the suspension control valve V2 is stuck, a state where a short circuit or disconnection has occurred in a circuit formed by the suspension control valve V2 and the control substrate 52, and the like. The control substrate 52 can determine whether an abnormality has occurred in the suspension control valve V2, for example, based on an electric current value and the like when the suspension control valve V2 is energized.

When it is determined that an abnormality has occurred in the suspension control valve V2 (step S102: YES), the process proceeds to step S103. In step S103, the control substrate 52 sets the first relay R1 to a closed state, and sets the second relay R2 to an open state, and the process returns to step S102. On the other hand, when it is determined that an abnormality has not occurred in the suspension control valve V2 (step S102: NO), the process proceeds to step S104. In step S104, the control substrate 52 sets both the first relay R1 and the second relay R2 to a closed state, and the process returns to step S102.

As described above, in the first processing example, when an abnormality has occurred in the suspension control valve V2, the first relay R1 is set to a closed state, and the second relay R2 is set to an open state. Therefore, the brake control circuit 52a can drive the brake control valve V1 using electric power supplied from the power supply B1. Therefore, the function of controlling the hydraulic pressure of the brake fluid can be used. On the other hand, since electric power is not supplied from the power supply B1 to the suspension control valve V2, the suspension control circuit 52b cannot drive the suspension control valve V2. Therefore, the function of controlling a damping force of a suspension cannot be used. Consequently, the function of controlling a damping force of a suspension cannot be used due to occurrence of an abnormality in the suspension control valve V2, but a situation in which the function of controlling the hydraulic pressure of the brake fluid can be used is maintained. In such a manner, when an abnormality has occurred in the suspension control valve V2, it is possible to suppress unnecessary occurrence of a situation in which both the function of controlling the hydraulic pressure of the brake fluid and the function of controlling a damping force of a suspension cannot be used.

Figure 7:
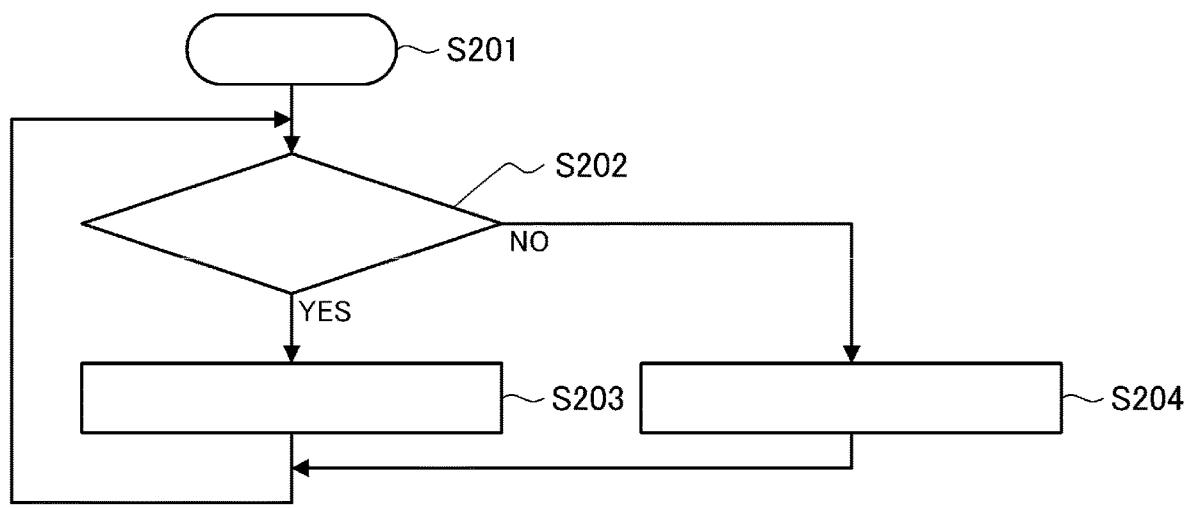
FIG. 7 is a flowchart showing the flow of a second processing example performed by the control substrate according to the embodiment of the invention.

FIG. 7 is a flowchart showing the flow of the second processing example performed by the control substrate 52. Step S201 in FIG. 7 corresponds to a start of a control flow shown in FIG. 7.

When the control flow of the second processing example shown in FIG. 7 is started, in step S202, the control substrate 52 determines whether an abnormality has occurred in the brake control valve V1.

An abnormality of the brake control valve V1 means a state where the brake control valve V1 cannot be properly controlled. Examples of an abnormality of the brake control valve V1 include a state where a movable portion of the brake control valve V1 is stuck, a state where a short circuit or disconnection has occurred in a circuit formed by the brake control valve V1 and the control substrate 52, and the like. The control substrate 52 can determine whether an abnormality has occurred in the brake control valve V1, for example, based on an electric current value and the like when the brake control valve V1 is energized.

When it is determined that an abnormality has occurred in the brake control valve V1 (step S202: YES), the process proceeds to step S203. In step S203, the control substrate 52 sets the first relay R1 to an open state, and sets the second relay R2 to a closed state, and the process returns to step S202. On the other hand, when it is determined that an abnormality has not occurred in the brake control valve V1 (step S202: NO), the process proceeds to step S204. In step S204, the control substrate 52 sets both the first relay R1 and the second relay R2 to a closed state, and the process returns to step S202.

As described above, in the second processing example, when an abnormality has occurred in the brake control valve V1, the first relay R1 is set to an open state, and the second relay R2 is set to a closed state. Therefore, electric power is not supplied from the power supply B1 to the brake control valve V1, so that the brake control circuit 52a cannot drive the brake control valve V1. Therefore, the function of controlling the hydraulic pressure of the brake fluid cannot be used. On the other hand, the suspension control circuit 52b can drive the suspension control valve V2 using electric power supplied from the power supply B1. Therefore, the function of controlling a damping force of a suspension can be used. Consequently, the function of controlling the hydraulic pressure of the brake fluid cannot be used due to occurrence of an abnormality in the brake control valve V1, but a situation in which the function of controlling a damping force of a suspension can be used is maintained. In such a manner, when an abnormality has occurred in the brake control valve V1, it is possible to suppress unnecessary occurrence of a situation in which both the function of controlling the hydraulic pressure of the brake fluid and the function of controlling a damping force of a suspension cannot be used.

Figure 8:
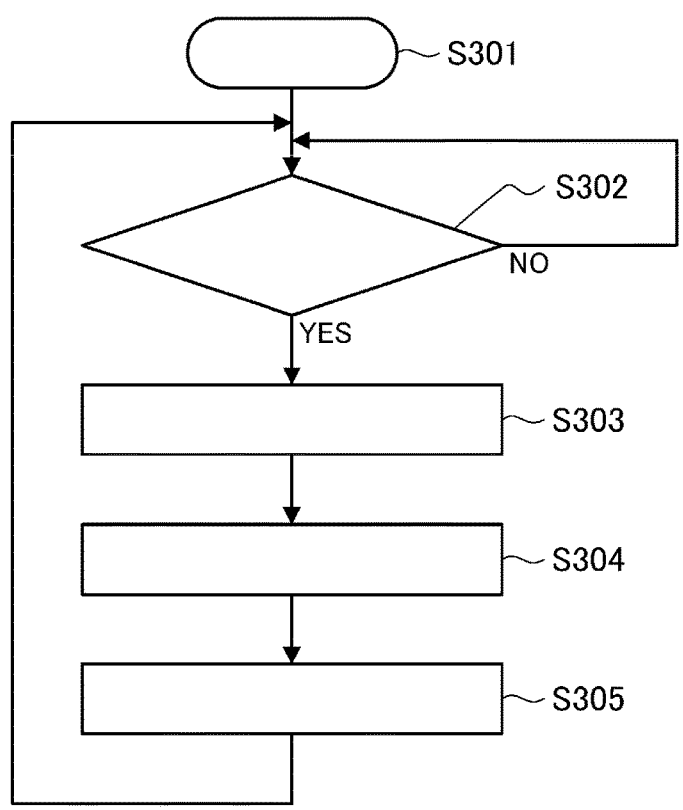
FIG. 8 is a flowchart showing the flow of a third processing example performed by the control substrate according to the embodiment of the invention.

FIG. 8 is a flowchart showing the flow of the third processing example performed by the control substrate 52. Step S301 in FIG. 8 corresponds to a start of a control flow shown in FIG. 8.

When the control flow of the third processing example shown in FIG. 8 is started, in step S302, the control substrate 52 determines whether a condition for starting an inspection of the brake control valve V1 is satisfied.

For example, the inspection of the brake control valve V1 is repeatedly executed at set time intervals (for example, 20 seconds or the like). Therefore, as the condition for starting the inspection of the brake control valve V1, for example, a condition that the set time has elapsed from a previous inspection is used. Incidentally, the inspection of the brake control valve V1 is executed in a state where the brake control valve V1 is not driven. Therefore, in detail, as the condition for starting the inspection of the brake control valve V1, for example, a condition that the set time has elapsed from the previous inspection and the brake control valve V1 is not driven is used.

When it is determined that the condition for starting the inspection of the brake control valve V1 is not satisfied (step S302: NO), the process of step S302 is repeated. On the other hand, when it is determined that the condition for starting the inspection of the brake control valve V1 is satisfied (step S302: YES), the process proceeds to step S303.

In step S303, the control substrate 52 sets the first relay R1 to an open state, and sets the second relay R2 to a closed state.

In step S304 subsequent to step S303, the control substrate 52 executes the inspection of the brake control valve V1.

In the inspection of the brake control valve V1, whether there is a defect in an electric circuit including the brake control valve V1 (for example, whether there is disconnection or the like), whether there is a defect in the brake control valve V1 itself (for example, whether there is sticking or the like), and the like are inspected. In such a manner, in the inspection of the brake control valve V1, a plurality of types of inspections are performed. There is an electric resistance inspection among such the plurality of types of inspections. In the electric resistance inspection, the control substrate 52 inspects the brake control valve V1 for an electric resistance in a state where an electric current is applied to the brake control valve V1. Specifically, in the electric resistance inspection, a very small electric current is applied to the brake control valve V1 from the brake control circuit 52a, and a value of an electric resistance of the brake control valve V1 is checked based on the amount of an electric voltage drop at this time. In such an electric resistance inspection, it is necessary to shut off energization between the brake control valve V1 and the power supply B1. Therefore, in step S303, the first relay R1 is in an open state in advance.

In step S305 subsequent to step S304, the control substrate 52 sets both the first relay R1 and the second relay R2 to a closed state, and the process returns to step S302.

As described above, in the third processing example, when the electric resistance inspection of the brake control valve V1 is executed, the first relay R1 is set to an open state, and the second relay R2 is set to a closed state. Therefore, the brake control circuit 52a can properly execute the electric resistance inspection in a state where energization between the brake control valve V1 and the power supply B1 is shut off. On the other hand, the suspension control circuit 52b can drive the suspension control valve V2 using electric power supplied from the power supply B1. Therefore, the function of controlling a damping force of a suspension can be used. Consequently, when the electric resistance inspection of the brake control valve V1 is executed, a situation in which the function of controlling a damping force of a suspension can be used is maintained. In such a manner, when the electric resistance inspection of the brake control valve V1 is executed, it is possible to suppress unnecessary occurrence of a situation in which both the function of controlling the hydraulic pressure of the brake fluid and the function of controlling a damping force of a suspension cannot be used.

Incidentally, as examples of control processing related to electric power supply performed by the control substrate 52, each of the first processing example, the second processing example, and the third processing example has been described above. However, the control substrate 52 may execute the first processing example, the second processing example, and the third processing example in combination. For example, the control substrate 52 may execute both the first processing example and the second processing example. Incidentally, in this case, when an abnormality has occurred in the brake control valve V1, the control substrate 52 sets the first relay R1 to an open state regardless of whether there is an abnormality in the suspension control valve V2. In addition, when an abnormality has occurred in the suspension control valve V2, the control substrate 52 sets the second relay R2 to an open state regardless of whether there is an abnormality in the brake control valve V1. In addition, for example, the control substrate 52 may execute both the first processing example and the third processing example. Incidentally, in this case, when an abnormality has occurred in the suspension control valve V2, the control substrate 52 sets the second relay R2 to an open state regardless of whether the inspection of the brake control valve V1 is executed. In addition, for example, the control substrate 52 may execute both the second processing example and the third processing example. Incidentally, in this case, when an abnormality has occurred in the brake control valve V1, the control substrate 52 prohibits the inspection of the brake control valve V1. In addition, for example, the control substrate 52 may execute all of the first processing example, the second processing example, and the third processing example.

<Effects of Hydraulic Pressure Controller>

Effects of the hydraulic pressure controller 5 according to the embodiment of the invention will be described.

The hydraulic pressure controller 5 includes the hydraulic pressure control mechanism 51 including the brake control valve V1 for controlling a hydraulic pressure of a brake fluid, and the control substrate 52 including the brake control circuit 52a that controls an operation of the brake control valve V1. In addition, the control substrate 52 includes the suspension control circuit 52b that controls an operation of the suspension control valve V2 for controlling a damping force of a suspension (in the above-described example, the front suspension 15 and the rear suspension 16) of the vehicle 100; the first relay R1 that enables energization between the brake control valve V1 and the power supply B1 when the first relay R1 is in a closed state, and that shuts off energization between the brake control valve V1 and the power supply B1 when the first relay R1 is in an open state; and the second relay R2 that is separate from the first relay R1, that enables energization between the suspension control valve V2 and the power supply B1 when the second relay R2 is in a closed state, and that shuts off energization between the suspension control valve V2 and the power supply B1 when the second relay R2 is in an open state.

Therefore, since a function of controlling the hydraulic pressure of the brake fluid and a function of controlling a damping force of a suspension are integrated into the hydraulic pressure controller 5 that is one control unit, the number of control units mounted to the vehicle 100 can be reduced. Specifically, a suspension control unit including a substrate and a housing that houses the substrate is not provided to the vehicle 100 separately from the hydraulic pressure controller 5, so that a mounting space for devices in the vehicle 100 can be saved. Further, since electric power can be supplied to both the brake control valve V1 and the suspension control valve V2, and electric power can be independently supplied to only one thereof, it is possible to suppress occurrence of a situation in which both the function of controlling the hydraulic pressure of the brake fluid and the function of controlling the damping force of the suspension cannot be used. Therefore, even in the case where the function of controlling the hydraulic pressure of the brake fluid and the function of controlling the damping force of the suspension are integrated into the hydraulic pressure controller 5, it is possible to suppress unnecessary occurrence of a situation in which both the functions cannot be used. Consequently, a mounting space for devices in the vehicle 100 can be properly saved.

Further, in the hydraulic pressure controller 5, unlike the case where the brake control valve V1 and the suspension control valve V2 are connected to the power supply B1 via one common relay, since an electric current to be sent to each valve from the power supply B1 is distributed to each relay, an electric current flowing through each relay is reduced. Therefore, the amount of heat generated in each relay can be reduced. Therefore, a relay with a small rating can be adopted.

Preferably, in the hydraulic pressure controller 5, the brake control circuit 52a and the suspension control circuit 52b are connected to the common communication line L1. Therefore, noise is reduced due to sharing of the communication line L1 between the control circuits, the communication line L1 being provided in the control substrate 52, so that communication is stabilized and communication between each control circuit and a device outside the hydraulic pressure controller 5 can be realized. In addition, the control circuits can also directly communicate with each other via the communication line L1.

Preferably, in the hydraulic pressure controller 5, the brake control circuit 52a and the suspension control circuit 52b are connected to the common ground line L2. Therefore, noise is reduced by setting a reference potential of each control circuit via the ground line L2 provided in the control substrate 52, so that communication can be stabilized. Therefore, communication between each control circuit and each device is properly realized.

Preferably, in the hydraulic pressure controller 5, when an abnormality has occurred in the suspension control valve V2, the control substrate 52 sets the first relay R1 to a closed state, and sets the second relay R2 to an open state. Therefore, the function of controlling the damping force of the suspension cannot be used due to occurrence of an abnormality in the suspension control valve V2, but a situation in which the function of controlling the hydraulic pressure of the brake fluid can be used is maintained. In such a manner, when an abnormality has occurred in the suspension control valve V2, it is possible to suppress unnecessary occurrence of a situation in which both the function of controlling the hydraulic pressure of the brake fluid and the function of controlling the damping force of the suspension cannot be used.

Preferably, in the hydraulic pressure controller 5, when an abnormality has occurred in the brake control valve V1, the control substrate 52 sets the first relay R1 to an open state, and sets the second relay R2 to a closed state. Therefore, the function of controlling the hydraulic pressure of the brake fluid cannot be used due to occurrence of an abnormality in the brake control valve V1, but a situation in which the function of controlling the damping force of the suspension can be used is maintained. In such a manner, when an abnormality has occurred in the brake control valve V1, it is possible to suppress unnecessary occurrence of a situation in which both the function of controlling the hydraulic pressure of the brake fluid and the function of controlling the damping force of the suspension cannot be used.

Preferably, in the hydraulic pressure controller 5, when an electric resistance inspection for inspecting the brake control valve V1 for an electric resistance is executed in a state where an electric current is applied to the brake control valve V1, the control substrate 52 sets the first relay R1 to an open state, and sets the second relay R2 to a closed state. Therefore, when the electric resistance inspection of the brake control valve V1 is executed, a situation in which the function of controlling the damping force of the suspension can be used is maintained, so that it is possible to suppress unnecessary occurrence of a situation in which both the function of controlling the hydraulic pressure of the brake fluid and the function of controlling the damping force of the suspension cannot be used.

Preferably, in the hydraulic pressure controller 5, the vehicle 100 is a straddle-type vehicle. Therefore, a mounting space for devices in the straddle-type vehicle can be properly saved. Since the mounting space for devices in the straddle-type vehicle is narrower than mounting spaces in other vehicles, the invention is particularly effective to properly save the mounting space for devices in the straddle-type vehicle.

The invention is not limited to the description of the embodiment. For example, only a part of the embodiment may be executed.

What is claimed is:

1. A hydraulic pressure controller for a vehicle, the controller comprising:
   a hydraulic pressure control mechanism including a brake control valve for controlling a hydraulic pressure of a brake fluid; and
   a control substrate including a brake control circuit that controls an operation of the brake control valve,
   wherein the control substrate includes a suspension control circuit that controls an operation of a suspension control valve for controlling a damping force of a suspension of the vehicle, a first relay that enables energization between the brake control valve and a power supply when the first relay is in a closed state, and that shuts off energization between the brake control valve and the power supply when the first relay is in an open state, and a second relay that is separate from the first relay, that enables energization between the suspension control valve and the power supply when the second relay is in a closed state, and that shuts off energization between the suspension control valve and the power supply when the second relay is in an open state.

2. The hydraulic pressure controller according to claim 1, wherein the brake control circuit and the suspension control circuit are connected to a common communication line.

3. The hydraulic pressure controller according to claim 1, wherein the brake control circuit and the suspension control circuit are connected to a common ground line.

4. The hydraulic pressure controller according to claim 1, wherein when an abnormality has occurred in the suspension control valve, the control substrate sets the first relay to a closed state, and sets the second relay to an open state.

5. The hydraulic pressure controller according to claim 1, wherein when an abnormality has occurred in the brake control valve, the control substrate sets the first relay to an open state, and sets the second relay to a closed state.

6. The hydraulic pressure controller according to claim 1, wherein when an electric resistance inspection for inspecting the brake control valve for an electric resistance is executed in a state where an electric current is applied to the brake control valve, the control substrate sets the first relay to an open state, and sets the second relay to a closed state.

7. The hydraulic pressure controller according to claim 1, wherein the vehicle is a straddle-type vehicle.

\* \* \* \* \*